(12) United States Patent  (10) Patent No.: US 9,514,155 B1
Majumdar et al.  (45) Date of Patent: Dec. 6, 2016

(54) DATA PRESENTATION AT DIFFERENT LEVELS OF DETAIL

(71) Applicant: Amazon Technologies, Inc., Reno, NV (US)

(72) Inventors: Debarghya Majumdar, Tribeni Ghat (IN); Amit Neogy, Hyderabad (IN); Niketh Sabbineni, Hyberabad (IN); Nadella Sindhuri, West Godavari District (IN)

(73) Assignee: Amazon Technologies, Inc., Reno, NV (US)

( * ) Notice: Subject to any disclaimer, the term of this patent is extended or adjusted under 35 U.S.C. 154(b) by 281 days.

(21) Appl. No.: 14/078,423

(22) Filed: Nov. 12, 2013

(51) Int. Cl.
*G06F 17/30* (2006.01)
*G06F 7/00* (2006.01)

(52) U.S. Cl.
CPC ... *G06F 17/30241* (2013.01); *G06F 17/30386* (2013.01); *G06F 17/30598* (2013.01)

(58) Field of Classification Search
None
See application file for complete search history.

(56) References Cited

U.S. PATENT DOCUMENTS

| | | | | |
|---|---|---|---|---|
| 6,356,363 B1* | 3/2002 | Cooper | G06K 15/00 | 358/1.8 |
| 8,290,971 B2* | 10/2012 | Klawitter | G06F 17/30905 | 707/755 |
| 8,660,358 B1* | 2/2014 | Bergboer | G06K 9/00677 | 345/629 |
| 2003/0061035 A1* | 3/2003 | Kadambe | G06K 9/624 | 704/203 |
| 2004/0218894 A1* | 11/2004 | Harville | G06F 17/30241 | 386/241 |
| 2006/0036372 A1* | 2/2006 | Yener | G06K 9/0014 | 702/19 |
| 2006/0179159 A1* | 8/2006 | Rosenau | H04L 47/365 | 709/247 |
| 2008/0010605 A1* | 1/2008 | Frank | G06F 17/30241 | 715/765 |
| 2008/0046805 A1* | 2/2008 | Shewchenko | G06F 3/0481 | 715/215 |
| 2011/0055210 A1* | 3/2011 | Meredith | G06F 17/30601 | 707/737 |
| 2011/0246409 A1* | 10/2011 | Mitra | G06F 17/18 | 706/52 |
| 2013/0182002 A1* | 7/2013 | Macciola | H04N 1/387 | 345/589 |
| 2013/0332077 A1* | 12/2013 | Khetan | G08G 1/0962 | 701/533 |

* cited by examiner

*Primary Examiner* — Dung K Chau

(74) *Attorney, Agent, or Firm* — Athorus, PLLC

(57) ABSTRACT

This disclosure describes a system and process for altering the presentation of data items to enable efficient presentation of large sets of data items. For example, if a data set includes 40,000 data items that are to be rendered as points at different geographic locations on a map, such as a map of the United States, rather than trying to render all 40,000 data items, the implementations described herein will process the data set to reduce the amount of data items that will be presented without losing the information that is visually provided.

23 Claims, 5 Drawing Sheets

DATA PRESENTATION AT DIFFERENT LEVELS OF DETAIL

BACKGROUND

Visualization of data is a helpful tool in identifying problems, monitoring loads, etc. For example, traffic data may be aggregated and visually presented on maps to identify areas of congestion. This may be done in near-real time or based on historical data. However, as the amount of data to be presented increases it becomes difficult to efficiently render the data and/or it makes the presented data unusable do to the size and time required to present the data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
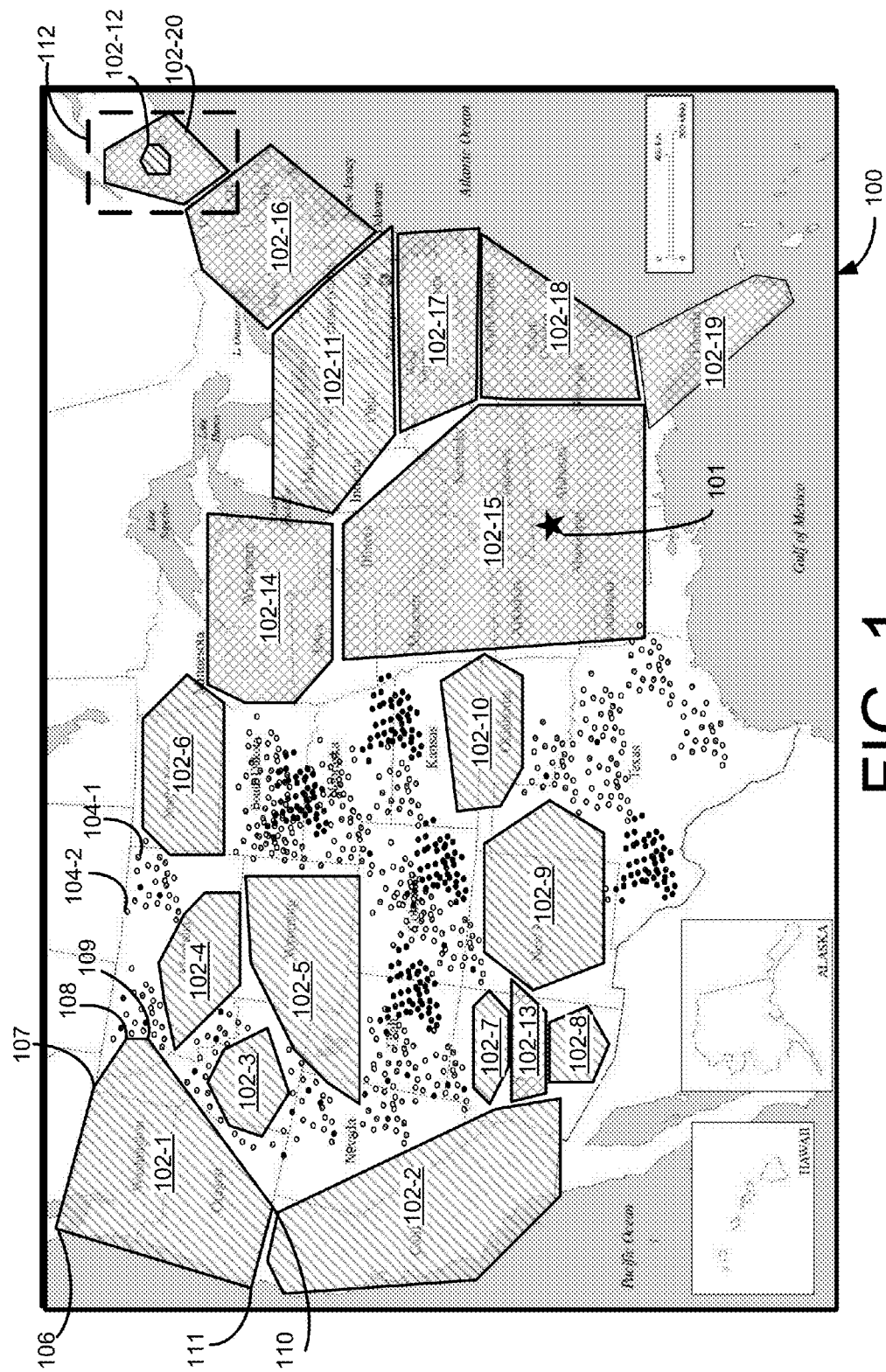
FIG. 1 depicts a block diagram of a data set presented on a map at a first level of detail, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system and process for altering the number of data items that are provided in response to a request for data items to be presented so that the data items can be quickly and efficiently presented on a client device without losing the visual information provided by the presentation. For example, if there are 40,000 data items that satisfy a request for data items that are to be presented as points at different geographic locations on a map, such as a map of the United States, rather than providing all 40,000 data items, the implementations described herein will process the data items to reduce the amount of data items that will be provided in response to the request so that they can be presented efficiently and quickly without losing the information provided through the visualization of the data items.

To illustrate, the data items may be processed to identify groups of data items that are within a similar geographic location such that they can be associated with a cluster. For example, there may be different groups of data items of a same data item type that are densely located such that the data items can be associated to form a cluster of data items. A two-dimensional object, such as a polygon, may then be generated and associated with the cluster and used to visually represent all of the data items of the cluster. In one implementation, the two-dimensional object may be configured such that when it is presented on the map it surrounds or covers the geographic coordinates of each data item associated with the cluster.

Multiple clusters of data items and corresponding objects may be generated for data items satisfying a request, each cluster and corresponding object representing a different group of data items. After generating the clusters and corresponding objects, rather than providing for presentation all of the data items satisfying the request, only the objects representative of each cluster and any data items not associated with a cluster are provided for presentation.

As discussed in further detail below, clustering may be done depending on the amount of data items to be presented. For example, a presentation threshold may be established that identifies the number of data items that can be presented. The presentation threshold may be any number, such as 8,000 data items. If the presentation request would result in more data items being presented than the presentation threshold, the data items satisfying the request for data items may be reduced. If the user then changes the presentation request (e.g., changes the zoom level and/or location of the map) the number of data items satisfying the request may again be considered to determine if the data items satisfying the request should be reduced before provided for presentation.

Figure 2:
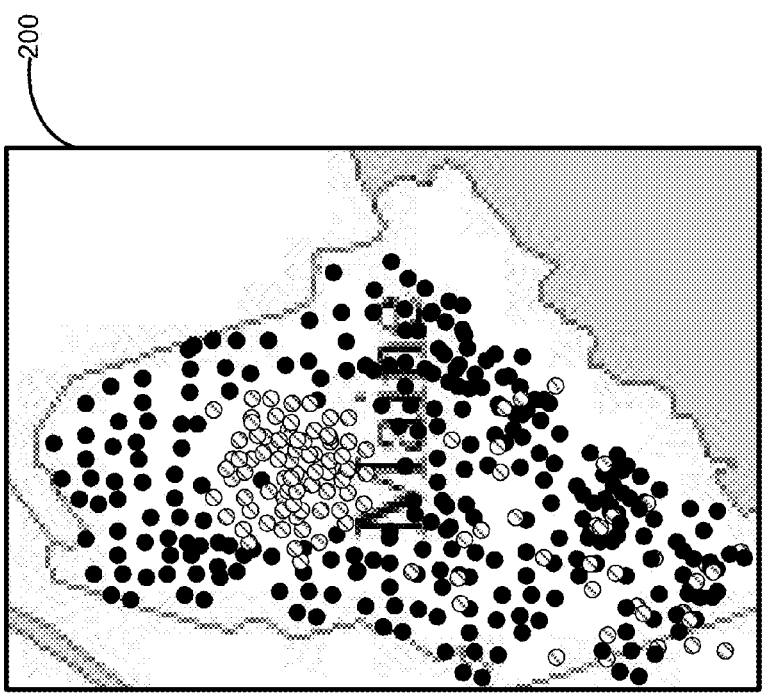
FIG. 2 depicts a block diagram of a data set presented on a map at a second level of detail, according to an implementation.

By reducing the data items satisfying the request through the formation of clusters and providing objects representative of the data items of a cluster, the amount of data items satisfying the request is reduced. Likewise, because clusters are represented by objects, the visual information is not lost. FIGS. 1 and 2 provide an example presentation of a data items in response to a request for data items, according to an implementation.

FIG. 1 depicts a block diagram of a data items and objects representative of clusters of data items presented on a map 100 at a first level of detail, according to an implementation. The data items represented in FIG. 1 relate to transit time from an origin location 101 to different destinations throughout the United States. The origin location 101 may be a materials handling facility, such as, but not limited to, a warehouse, a distribution center, a cross-docking facility, an order fulfillment facility, a packaging facility, a shipping facility, a rental facility, a library, a retail store, a wholesale store, a museum, or any other facility from which items may be transported. In other implementations, the data set may relate to transit times from multiple materials handling facilities and/or may include a larger (e.g., the entire world) or smaller (e.g., state, city, town) geographic area.

In this example there are 400,000 data items that satisfy a request for data items to present on the map 100. Each data item is one of two different data item types and each includes a geographic location (e.g., the geographic location of the destination). The data item types in this example correspond to transit times for a physical object that are less than or equal to 24 hours and transit times that are greater than 24 hours. Transit times that are less than or equal to 24 hours are represented by the side hatched two-dimensional objects 102-1-102-12 and the side hatched two-dimensional data points 104-1. Transit times that are greater than 24 hours are represented by the cross-hatched two-dimensional objects 102-13-102-15 and the solid black two-dimensional data points 104-2.

The geographic location of each data item may be, for example, the geographic coordinates of the destination location, an address associated with the destination location, a geographic location of a delivery vehicle when the physical item was delivered to the destination location, and/or any other geographic location that can be used to represent the destination of the physical item. In some implementations, additional information, such as an identification of the delivered physical item, the carrier, the shipping speed, the weather at the time of delivery, the time of delivery, etc. may be included in the data item.

As shown, the zoom level of the map 100 has been set so that the entire United States is visible and thus all the data items with geographic locations within the United States satisfy the request for data items. To facilitate presentation, the implementations discussed herein reduce the number of data items provided in response to the request by representing clusters of data items with two-dimensional objects 102-1-102-20. In this example, rather than providing all 400,000 data items for presentation, geographic areas with a high density of the same data item type have been clustered and represented by a polygon. The polygon may be formed by identifying boundary points that when connected the resulting exterior boundary encompasses the geographic location of all of the data items associated with the represented cluster. For example, the polygon 102-1 can be formed by providing the location of each boundary point 106, 107, 108, 109, 110, 111, providing instructions to connect those boundary points 106, 107, 108, 109, 110, 111 with lines and to shade, color or otherwise fill the resulting polygon when presented. For example, if the polygon represents data items representing deliveries that took longer than 24 hours (data item type) the instructions may identify that the polygon is to be filled with side hatched lines and to have a transparency of 50%, as illustrated by polygons 102-1-102-12. In comparison, polygons representing clusters of data items for deliveries of less than 24 hours may be filled with cross-hatched lines and have a transparency of 50%, as illustrated by polygons 102-13-102-14.

For data items that are not associated with a cluster, each data item may be represented with a data point presented on the map, such as data points 104-1, 104-2, at the geographic location associated with the data item. Data items that represent deliveries that took longer than 24 hours may be filled with side hatched lines, such as data points 104-1 and deliveries that took less than 24 hours may be filled in solid black, such as data points 104-2. While the examples discussed herein present item types based on side hatched lines, cross hatched lines or solid black, in other implementations other colors, sizes, shapes, characters, etc. may be utilized.

A user may interact with the map 100, the data points 104-1, 104-2 and/or the two-dimensional objects 102-1-102-20 to obtain additional information. For example, a user may select to zoom in on a particular area of the map 100, such as area 112. In response, a request for data items within the area 112 may be requested for presentation. As discussed further below, the implementations described herein may again determine the number of data items of the original data items that satisfy the request. If the data items satisfying the request would still result in too many data items being presented (e.g., exceeding the presentation threshold) the data items satisfying the request may again be reduced by clustering groups of data items. However, if the area of the map would not result in the rendering of too many data items, all of the data items satisfying the request may be provided for presentation. For example, turning to FIG. 2, by selecting to zoom into the area 112 (FIG. 1) the resulting map 200 may be presented. In this example, rather than clustering the data items, because the viewable area of the map is such that the number of data items satisfying the request does not exceed the presentation threshold, rather than clustering the data items, each data item is provided for presentation on the client device. In some implementations, the bounding lines of the cluster that was previously presented in the area, if one existed, may be maintained and presented with the individual data items. In other implementations, only the data items may be presented, as illustrated in FIG. 2.

As can be seen from the more detailed view of FIG. 2, a cluster may be generated at higher levels even though not all of the data items encompassed by the presentation of the cluster are of the same data item type. For example, in some implementations, when generating a cluster, if a determined percentage of the data items of the cluster are of the same data item type the cluster may represent all of the data items. For example, the cluster 102-12 (FIG. 1) which is presented as individual data items in FIG. 2 includes a small percentage of data items of a different data item type. In other implementations, data items of a different data item type may not be included in the cluster and may be provided for rendering or not provided for rendering when the area also includes an object representative of the cluster.

As illustrated in FIGS. 1 and 2, the implementations described herein allow a user to visualize information represented by large number of data items in a quick and efficient manner by clustering dense areas of data items of the same data item types and representing those clusters as an object rather than individual data items. Also, while the example provided above relates to visualizing data items for delivery of physical goods, the implementations described herein can be used to visualize other types of data as well. For example, the implementations discussed herein could be used to visualize carrier costs, damage rates for different carriers, missed delivery promises, weather disruptions, and the like.

Figure 3:
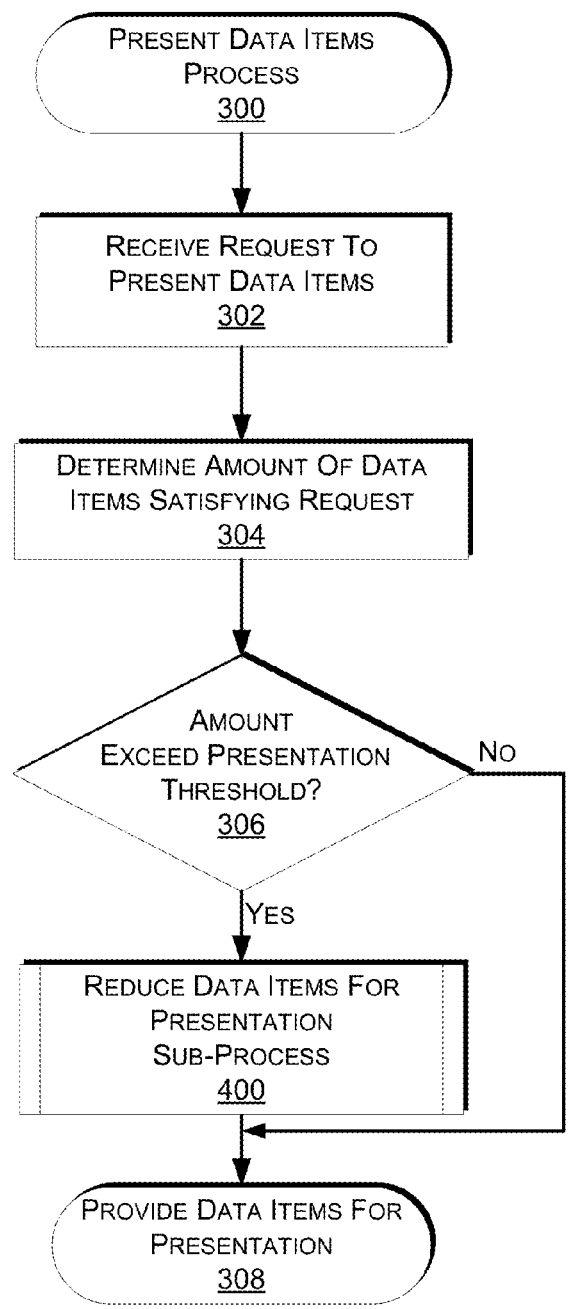
FIG. 3 is a flow diagram illustrating an example process for presenting data items at different levels of detail, according to an implementation.

FIG. 3 is a flow diagram illustrating an example process 300 for providing data items for rendering and presentation on a client device. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 300 begins by receiving a request to present data items, as in 302. For example, a user may utilize a web based mapping tool, such as Microsoft's Bing Maps, or Google's Google Maps and request to overlay data items on an area of a map. The request may include a bounding area (e.g., the viewable area of the map) in which data items are to be rendered and presented. In some implementations, other qualifiers may also be included, such as the data item type, a time range for the data items, etc. In some implementations, rather than receiving a request by a client device, for example, it may be determined that data items are to be presented. For example, data items may be periodically pushed to presentation components for presentation, rather than in response to a request.

In response to receiving a request for data items, or determining that data items are to be presented, rather than attempting to provide all of the data items that satisfy the request, the example process 300 determines the amount of data items that satisfy the request, as in 304, a determination is made as to whether the amount of data items exceeds a presentation threshold, as in 306. The presentation threshold may be any number representing a limit of the amount of data items to be provided for presentation. In some implementations, the presentation threshold may be different for different requests, may vary based on the requesting client, may be based on the time of the request, may vary based on the processing and/or rendering capabilities of the client, and/or based on an estimated time required to render data items for presentation.

If it is determined that the amount of data items satisfying the request exceeds the presentation threshold, the reduce data items for presentation sub-process is performed, as in 400. The reduce data items for presentation sub-process 400 is discussed further below with respect to FIG. 4. However, if it is determined that the amount of data items satisfying the request does not exceed the presentation threshold, the example process 300 provides for presentation the data items satisfying the request, as in 308.

Figure 4:
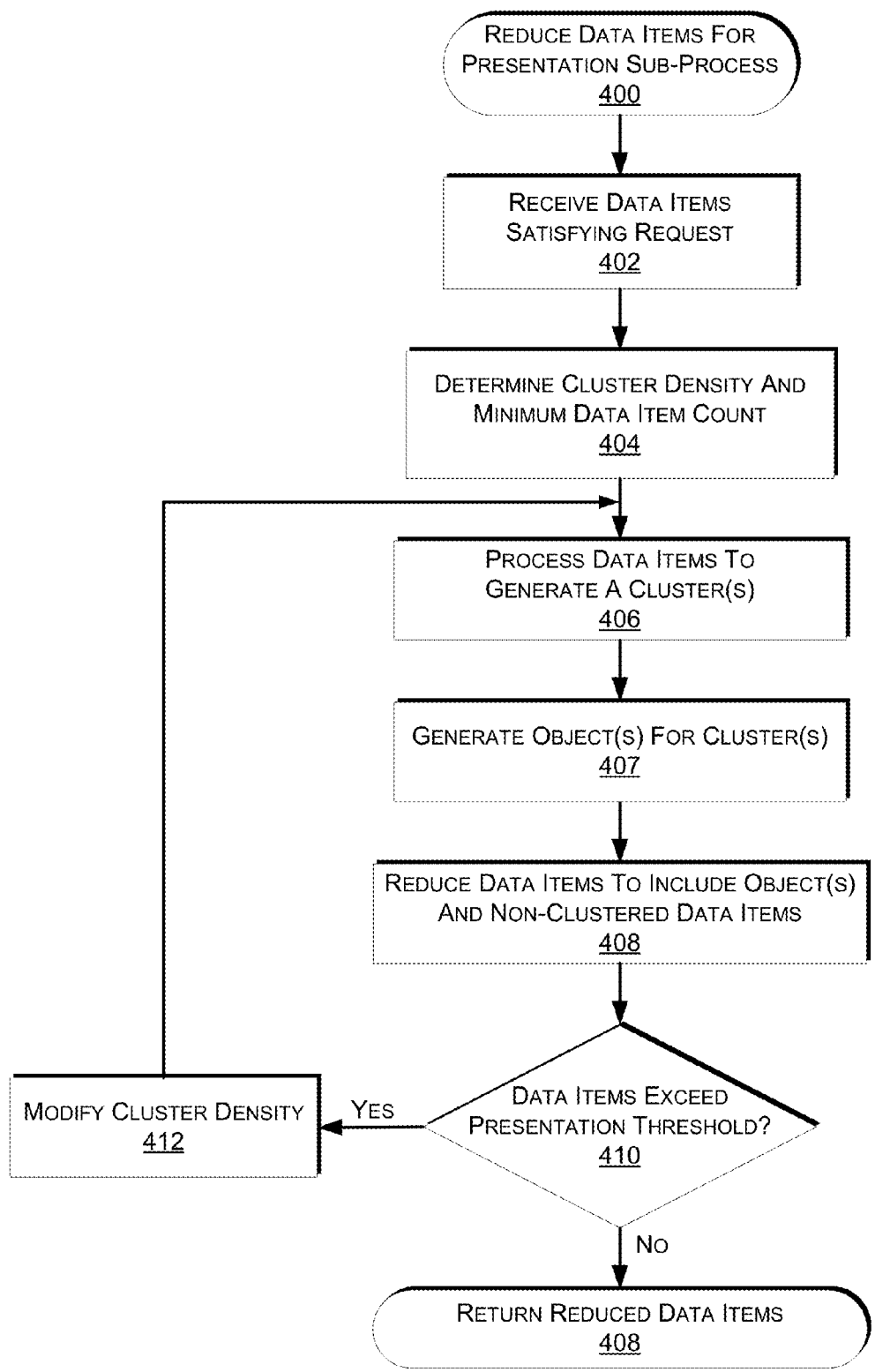
FIG. 4 is a flow diagram illustrating an example subprocess for reducing data items for presentation, according to an implementation.

FIG. 4 is a flow diagram illustrating an example sub-process 400 for reducing data items for presentation, according to an implementation. The example sub-process 400 begins by receiving the data items satisfying the request, as in 402. A cluster density and minimum number of data items per cluster is also determined, as in 404. A cluster density may be any distance between data items necessary for two data items to be associated (or directly density-reachable) for cluster formation. The cluster density may be determined based on the geographic size of a bounding area in which data items are presented, based on the total number of data items and the presentation threshold, and the like. As discussed below, if the algorithm used to cluster data items is the Density Based Spatial Clustering of Applications With Noise (DBSCAN) algorithm, the cluster density or distance is represented as $\epsilon$ (eps). The minimum number of data items may be any defined number of data items required to form a cluster. For example, the minimum number of data items may be a percentage of the total data items, a set number, etc.

Based on the cluster density and minimum number of data items, the data items satisfying the request may be processed to identify and generate clusters, as in 406. Any number of clustering algorithms may be used to cluster data items. In one implementation, DBSCAN may be used. In such an implementation, a data item satisfying the request is selected (e.g., at random) for consideration and all neighboring data items are analyzed to determine if the neighboring data item is less than or equal to the distance $\epsilon$ (eps). If a neighbor data item is within the distance $\epsilon$ (eps) it is considered directly density-reachable. If there are a sufficient number of data items (more than the minimum number of data items) within the distance $\epsilon$ (eps) a cluster is formed that includes those data items. If the minimum number of data items is not satisfied, the data item under consideration is not associated with the cluster and the processing moves to the next data item and continues. It is worth noting that the data item under consideration may later be associated with a cluster if it is part of a sufficient number of data items for another data item under consideration. If a data item is found to be part of a cluster, its neighbors that are within the distance $\epsilon$ (eps) are also included in the cluster.

In some implementations, clustering is done regardless of the data item type and if a cluster is found it is used to represent the data item type associated with a majority of the data items associated with the cluster. In other implementations, the clustering algorithm may only process neighbor data items of the same data item type as the data item under consideration. For example, if the data item under consideration represents a delivery that took longer than 24 hours (data item type), the clustering algorithm may only consider other neighbor data items that also represent deliveries that took longer than 24 hours.

For each formed cluster, a corresponding object, such as a two-dimensional object, may be generated to represent the cluster of data items. For example, a convex hull may be determined for the cluster. A convex hull or convex envelope is the smallest convex set that contains all of the data points of the cluster. A convex hull algorithm may be used to determine an exterior boundary surrounding each cluster. For example, any one or more of a Jarvis march algorithm, a Graham scan algorithm, a QuickHull algorithm, a Divide and conquer algorithm, a Monotone chain algorithm, an Incremental convex hull algorithm, an ultimate planar convex hull algorithm, or a Chan's algorithm may be used to determine an exterior boundary around all the data items. In other implementations, other bounding techniques may be used to generate an object that includes each of the data items associated with the cluster.

In some implementations, a color or shading may be applied to the object that represents the cluster of data items. For example, instructions may be provided to connect the exterior points of the two-dimensional object with lines to form the two-dimensional object and to fill the two-dimensional object with a shading, color, pattern, etc.

Upon creating an object(s) representative of the cluster(s), the example process 400 may reduce the data items corresponding to the request to include the object(s) representing the cluster(s) and any data points representative of non-clustered data items that satisfy the request, as in 408. For example, if the cluster includes 3,000 data items but the resulting object only has five exterior points and instructions to connect the exterior points and shade the object, the cluster can be represented with the five data objects and the instructions, rather than the 3,000 data objects.

A determination may then be made as to whether the data items, now reduced, exceed the presentation threshold, as in 410. If it is determined that the data items exceed the presentation threshold, the cluster density or distance may be modified, as in 412. For example, if too many data items remain after clustering, the minimum distance may be increased so that more items will potentially be included in each cluster, thereby reducing the number of non-clustered data items and possibly the number of clusters. Once the cluster density or distance is modified, the example sub-process 400 returns to block 406 and continues.

Returning to decision block 410, if it is determined that the data items, now reduced, do not exceed the presentation threshold, the example sub-process 400 returns the data items, as in 408.

Figure 5:
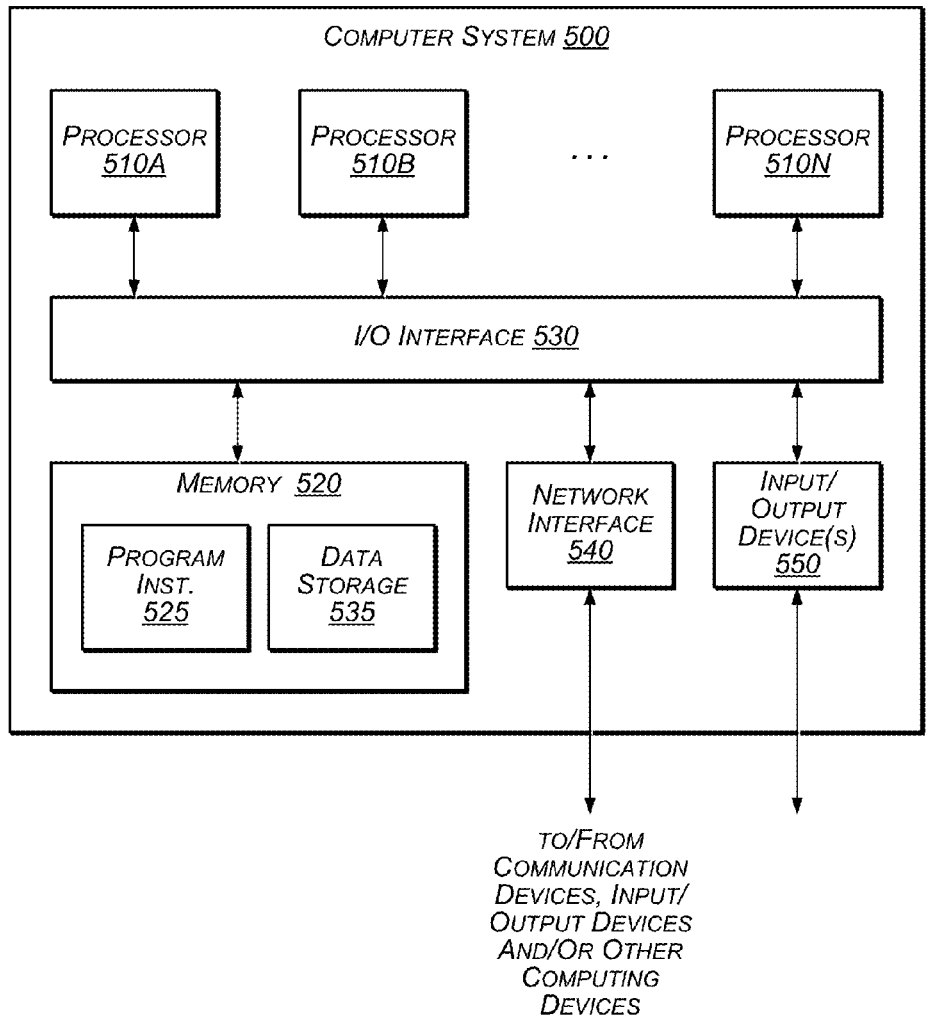
FIG. 5 is a block diagram illustrating an example computer system configured to implement one or more of the systems or processes described herein.

FIG. 5 is a block diagram illustrating an example computer system 500 configured to implement one or more of the systems or processes described herein. In various examples, the block diagram may be illustrative of one or more aspects of computing resources, such as remote computing resource(s) used to implement the various systems and methods discussed above. In the illustrated implementation, the computer system 500 includes one or more processors 510A, 510B through 510N, coupled to a non-transitory computer readable storage medium 520 via an input/output (I/O) interface 530. The computer system 500 further includes a network interface 540 coupled to an I/O interface 530, and one or more input/output devices 550.

In various implementations, the computer system 500 may be a uniprocessor system including one processor 510A, or a multiprocessor system including several processors 510A-510N (e.g., two, four, eight, or another suitable number). The processors 510A-510N may be any suitable processor capable of executing instructions. For example, in various implementations the processors 510A-510N may be general-purpose or embedded processors implementing any of a variety of instruction set architectures (ISAs), such as the x86, PowerPC, SPARC, or MIPS ISAs, or any other suitable ISA. In multiprocessor systems, each of the processors 510A-510N may commonly, but not necessarily, implement the same ISA.

The non-transitory computer readable storage medium 520 may be configured to store executable instructions, data and/or data items accessible by the one or more processors 510A-510N. In various implementations, the non-transitory computer readable storage medium 520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 520 as program instructions 525 and data storage 535, respectively. In other implementations, program instructions and/or data may be received, sent or stored upon different types of computer-accessible media, such as non-transitory media, or on similar media separate from the non-transitory computer readable storage medium 520 or the computer system 500. Generally speaking, a non-transitory, computer readable storage medium may include storage media or memory media such as magnetic or optical media, e.g., disk or CD/DVD-ROM coupled to the computer system 500 via the I/O interface 530. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 540.

In one implementation, the I/O interface 530 may be configured to coordinate I/O traffic between the processors 510A-510N, the non-transitory computer readable storage medium 520, and any peripheral devices, the network interface 540 or other peripheral interfaces, such as input/output devices 550. In some implementations, the I/O interface 530 may perform any necessary protocol, timing or other data transformations to convert data signals from one component (e.g., non-transitory computer readable storage medium 520) into a format suitable for use by another component (e.g., processors 510A-510N). In some implementations, the I/O interface 530 may include support for devices attached through various types of peripheral buses, such as a variant of the Peripheral Component Interconnect (PCI) bus standard or the Universal Serial Bus (USB) standard, for example. In some implementations, the function of the I/O interface 530 may be split into two or more separate components, such as a north bridge and a south bridge, for example. Also, in some implementations, some or all of the functionality of the I/O interface 530, such as an interface to the non-transitory computer readable storage medium 520, may be incorporated directly into the processors 510A-510N.

The network interface 540 may be configured to allow data to be exchanged between the computer system 500 and other devices attached to a network, such as other computer systems, or between nodes of the computer system 500. For example, the network interface 540 may enable communication between a client device that is rendering and/or presenting maps and data items and a remote computing resource that is provided data items for presentation. In various implementations, the network interface 540 may support communication via wired or wireless general data networks, such as any suitable type of Ethernet network. For example, the network interface 540 may support communication via telecommunications/telephony networks such as analog voice networks or digital fiber communications networks, via storage area networks such as Fibre Channel SANs, or via any other suitable type of network and/or protocol.

Input/output devices 550 may, in some implementations, include one or more display terminals, keyboards, keypads, touchpads, scanning devices, voice or optical recognition devices, or any other devices suitable for entering or retrieving data by one or more computer systems 500. Multiple input/output devices 550 may be present in the computer system 500 or may be distributed on various nodes of the computer system 500. In some implementations, similar input/output devices may be separate from the computer system 500 and may interact with one or more nodes of the computer system 500 through a wired or wireless connection, such as over the network interface 540.

As shown in FIG. 5, the memory 520 may include program instructions 525 which may be configured to implement the example processes and/or sub-processes described above. The data storage 535 may include various data stores for maintaining data items that may be provided for rendering.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories. These memories may be part of a single computer system or they may be distributed among two or more computer systems, such as two computer systems connected by a wired or wireless local area network, or through the Internet, in different implementations.

Those skilled in the art will appreciate that the computing system 500 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing system 500 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer implemented method, comprising:
   determining that a plurality of data items are to be presented on a client device;
   determining that an amount of the plurality of data items to be presented on the client device exceeds a presentation threshold;
   determining a cluster density parameter;
   determining a cluster that includes a first sub-plurality of the plurality of data items based at least in part on the cluster density parameter, wherein the first sub-plurality of data items include different data values for a same data item type, and wherein a second sub-plurality of the plurality of data items are not represented by the cluster;
   generating a two-dimensional object representative of the cluster, wherein at least a portion of a shape of the two-dimensional object corresponds to the different data values for the same data item type; and
   sending for presentation on the client device the two-dimensional object and the second sub-plurality of the plurality of data items.

2. The computer implemented method of claim 1, wherein the first sub-plurality of the plurality of data items are included within an exterior perimeter of the two-dimensional object.

3. The computer implemented method of claim 1, further comprising:
   determining to replace the presentation of at least a portion of the two-dimensional object and the second sub-plurality of data items with a presentation of a second plurality of data items, wherein the second plurality of data items include a sub-set of the plurality of data items;
   determining that an amount of the second plurality of data items does not exceed a presentation threshold; and sending for presentation on the client device the second plurality of data items.

4. The computer implemented method of claim 1, further comprising:
    determining to replace the presentation of at least a portion of the two-dimensional object and the second sub-plurality of data items with a presentation of a second plurality of data items, wherein the second plurality of data items include a sub-set of the plurality of data items;
    determining that an amount of the second plurality of data items exceeds the presentation threshold;
    determining a second cluster density parameter;
    determining a second cluster based at least in part on the second cluster density parameter, wherein the second cluster includes a first sub-plurality of the second plurality of data items, and wherein a second sub-plurality of the second plurality of data items are not included in the second cluster;
    generating a second two-dimensional object representative of the second cluster; and
    sending for presentation on the client device the second two-dimensional object and the second sub-plurality of the second plurality of data items.

5. The computer implemented method of claim 4, wherein the second plurality of data items is determined based at least in part on a zoom level associated with the client device.

6. The computer implemented method of claim 1, wherein the two-dimensional object and the second sub-plurality of the plurality of data items are sent for presentation on the client device with a map of a geographic area.

7. The computer implemented method of claim 1, wherein the cluster density parameter is further based at least in part on an estimated loading time for loading a data item for presentation on the client device.

8. The computer implemented method of claim 1, further comprising:
    determining the presentation threshold based at least in part on a zoom level input of a user;
    wherein the cluster density parameter is determined based at least in part on the presentation threshold; and
    wherein the cluster density parameter is determined subsequent to the determination that the amount of the plurality of data items exceeds a presentation threshold.

9. A computing system, comprising:
    one or more processors; and
    a memory coupled to the one or more processors and storing program instructions that when executed by the one or more processors cause the one or more processors to at least:
    receive a request for a plurality of data items;
    determine that an amount of the plurality of data items exceeds a presentation threshold;
    determine a cluster density parameter;
    determine a cluster that includes a first sub-plurality of the plurality of data items based at least in part on the cluster density parameter, wherein the first sub-plurality of data items have a first data item type and different data values;
    generate an object representative of the cluster, wherein at least a portion of a shape of the object corresponds to the different data values; and
    send for presentation, the object and a second sub-plurality of the plurality of data items, wherein the second sub-plurality of the plurality of data items are not represented by the object.

10. The computing system of claim 9, wherein the plurality of data items include data items of a first data item type and data items of a second data item type.

11. The computing system of claim 10, wherein the program instructions that when executed by the one or more processors further cause the one or more processors to at least:
    determine a second cluster that includes a third sub-plurality of the plurality of data items of the second data item type.

12. The computing system of claim 9, wherein the program instructions that when executed by the one or more processors further cause the one or more processors to at least:
    process the plurality of data items to generate a plurality of other clusters, wherein each other cluster of the plurality of other clusters includes a sub-plurality of the plurality of data items;
    for each other cluster, generate an object representative of the other cluster; and
    send for presentation, the object and a respective second sub-plurality of the plurality of data items.

13. The computing system of claim 12, wherein the program instructions that when executed by the one or more processors further cause the one or more processors to at least:
    determine that a sum of the objects representative of the cluster, the plurality of other clusters, and the respective second sub-pluralities of the plurality of data items does not exceed the presentation threshold.

14. The computing system of claim 9, wherein the presentation threshold represents an amount of data items that can be presented.

15. The computing system of claim 14, wherein the amount of data items that can be presented is based at least in part on an estimated time to present a data item.

16. The computing system of claim 9, wherein the cluster density parameter includes a distance, and wherein a data item is included in the cluster if the data item has a geographic location value that is within the distance of a geographic location value of another data item.

17. A non-transitory computer-readable storage medium storing instructions, the instructions when executed by a processor causing the processor to at least:
    determine that a plurality of data items are to be presented;
    determine that an amount of the plurality of data items exceeds a presentation threshold;
    determine a cluster density parameter;
    determine a cluster based at least in part on the cluster density parameter, wherein the cluster includes a first sub-plurality of the plurality of data items having different data values and a same data item type, and wherein a second sub-plurality of the plurality of data items are not included in the cluster;
    generate an object representative of the cluster, wherein at least a portion of a shape of the object corresponds to the different data values of the first sub-plurality of the plurality of data items; and
    send for presentation, the object and the second sub-plurality of the plurality of data items.

18. The non-transitory computer-readable storage medium of claim 17, wherein:
    each data item includes location coordinates for presentation as a point at the location coordinates on a map; and the object is configured for presentation as a two-dimensional object that surrounds the location coordinates of each of the first sub-plurality of the plurality of data items.

19. The non-transitory computer-readable storage medium of claim 17, wherein the cluster is determined based at least in part on a result of a Density Based Spatial Clustering of Applications with Noise algorithm.

20. The non-transitory computer-readable storage medium of claim 17, wherein an exterior boundary of the object is determined based at least in part on a result of a convex hull algorithm.

21. The non-transitory computer-readable storage medium of claim 20, wherein the convex hull algorithm is at least one of a Jarvis march algorithm, a Graham scan algorithm, a QuickHull algorithm, a Divide and conquer algorithm, a Monotone chain algorithm, an Incremental convex hull algorithm, an ultimate planar convex hull algorithm, or a Chan's algorithm.

22. The non-transitory computer-readable storage medium of claim 17, wherein the data items are processed to generate a plurality of clusters, each cluster including a plurality of data items having a same data item type.

23. The non-transitory computer-readable storage medium of claim 22, wherein each data item of the plurality of data items has at least one data item type of a plurality of data item types, and wherein the plurality of data item types represent an amount of time to transport a physical item from an origin to a destination.

* * * * *